G. RHODES.
Churn.
No. 8,959.
Patented May 18, 1852.
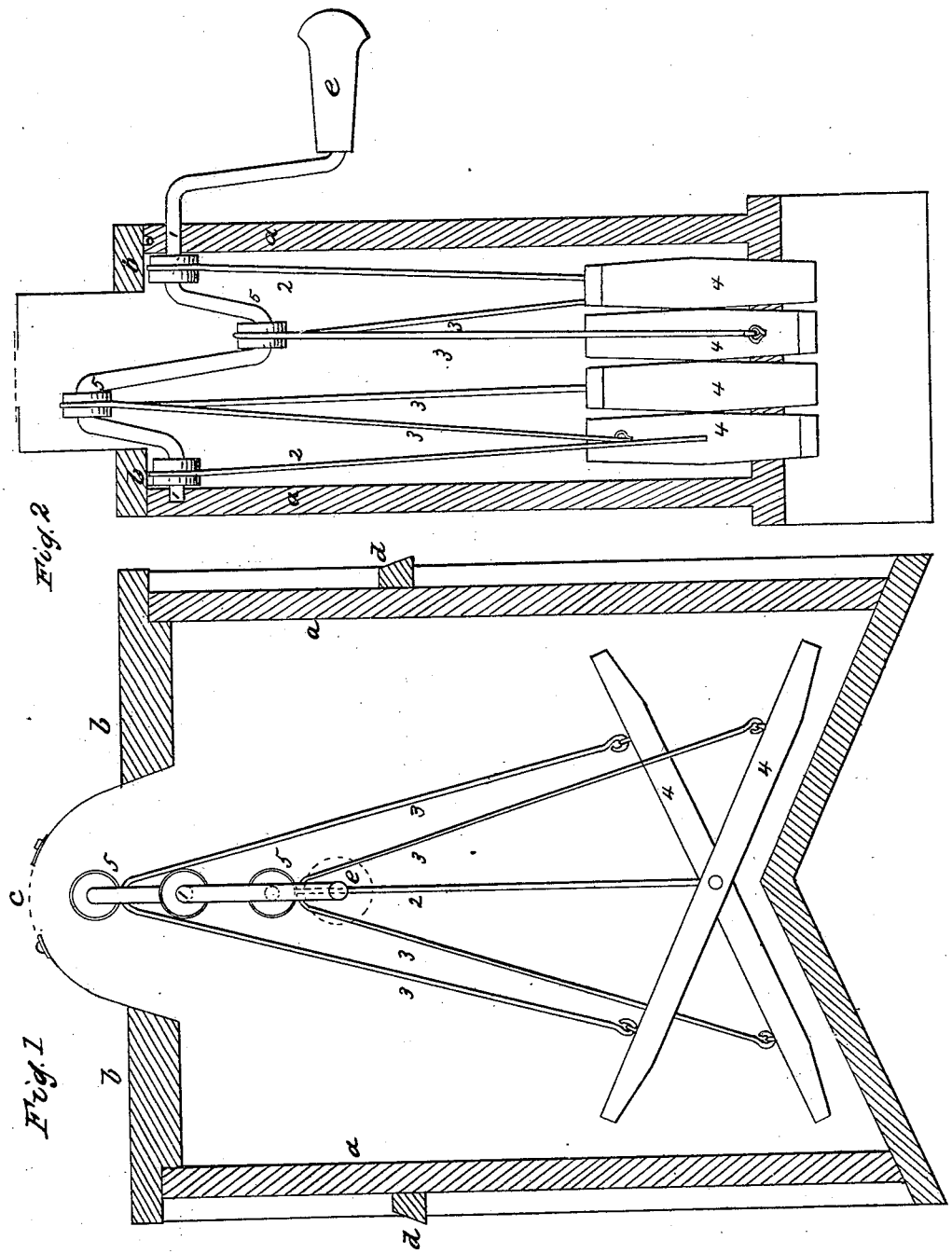

UNITED STATES PATENT OFFICE.

CLARKSON RHODES, OF MORROW, OHIO.

CHURN.

Specification of Letters Patent No. 8,959, dated May 18, 1852.

*To all whom it may concern:*

Be it known that I, CLARKSON RHODES, of Morrow, in the county of Warren, the State of Ohio, have invented a new and useful Improvement in the Common Churn; and I do hereby declare that the following is a full and exact description thereof, reference being had to the annexed drawings, making a part of this specification.

Similar figures and letters refer to corresponding parts of the improved churn.

Figure 1 is a longitudinal elevation in the form of a section, as regards the main box $a\ a$. Fig. 2, is a transverse sectional elevation, of the box $a\ a$ showing the interior arrangements.

The nature of my invention consists in the manner I work the beaters or dashers by a double bell cranked shaft together with the method I employ to suspend said beaters or dashers on their fulcrums.

To enable others skilled in the art to make and use my improvement I will proceed to describe its construction and operation.

$a, a$ Fig. 1 is the churn box made of suitable wood, and furnished with a top $b, b$, with a convex recess in the under part, to admit of the cranks 5, 5, a passage as they are turned around by the handle, $e$, the top part of the convex is furnished with a hole some 3/4 or an inch in diameter of which is provided with a tin plate, $c$, perforated with holes so as to ventilate the churn when in operation.

2, 2 is rods extending down from the shaft 1, 1, and connected to the fulcrum $f$ for the purpose of supporting said fulcrum on which the beaters or dashers (4, 4, 4, 4,)— vibrate (in Fig. 1, there is but two of the dashers seen, the remaining two is supposed to be in line and directly back of them, of which prevents them from being seen.)

3, 3, 3, 3, is rods attached to the crank 5, 5 formed in the shaft, 1, 1, by being bent into a bell crank shape and extending down to the dashers, 4, 4, 4, 4, and connected by means of eye pins to the dashers. When it is desired to put the churn in a prepared state for churning, the top $b, b$ is taken off, and the internal work is taken out, and cleaned if needed, the milk is poured in the box then, and the beaters replaced together with the top or cover, the shaft 1, 1, is turned by crank $c$, of which works the cranks 5, 5, and rods 3, 3, 3, 3 which gives the beaters or dashers 4, 4, 4, 4, an alternate up and down motion, and thereby causing an effectual churning of the milk.

What I claim as my improvement and desire to secure by Letters Patent is—

Changing the series of beaters or dashers 4, 4, 4, 4, by rods 2, 2, extending from the shaft 1, 1, the lower end of which rods supports the fulcrum $f$ on which the beaters or dashers move (not confining myself to the number or form of the dashers), the said dashers being operated by the rods 3, 3, 3, 3 and bell cranks 5, 5, substantially as therein set-forth.

CLARKSON RHODES.

Witnesses:
   EBENEZER HARRISON,
   MARTIN BENSON.